Patented July 23, 1946

2,404,588

UNITED STATES PATENT OFFICE 2,404,588

BASIC ESTERS OF 1-ARYL-CYCLOALKYL-1-CARBOXYLIC ACIDS AND A PROCESS FOR THEIR MANUFACTURE

Henry Martin and Franz Häfliger, Basel, Switzerland, assignors to J. R. Geigy A. G., Basel, Switzerland, a Swiss firm No Drawing. Application June 2, 1944, Serial No. 538,542. In Switzerland December 16, 1942

4 Claims. (Cl. 260—469)

The present application is a continuation-in-part of our copending application Ser. No. 506,760, filed October 18, 1943.

Therapeutically valuable compounds selected from the series of the cycloalkyl-monocarboxylic acids or of their homologues and substitution products respectively have not become known hitherto. It has now been found that the basic esters of cycloalkyl-1-carboxylic acids arylated in 1-position possess very valuable therapeutical properties.

In order to prepare the esters, for instance reactive derivatives of the 1-aryl-cycloalkyl-1-carboxylic acids, i. e. their halides, esters or anhydrides, are allowed to interact in the presence or absence of condensation agents with amino alcohols which are tertiarily substituted at the nitrogen atom or also reactive esters of the amino alcohols in question are allowed to react, if necessary in the presence of acid binding agents, with the aforementioned acids or salts thereof respectively. Among the 1-aryl-cycloalkyl-1-carboxylic acids there may be understood the corresponding unsubstituted and substituted compounds of the benzene series. As essential substituents may be mentioned: alkyl groups, while especially esters with hydrogen halide acids, with aryl sulfonic acids and the like may be used as reactive esters of amino alcohols. Moreover, it is also possible to convert 1-aryl-cycloalkyl-1-carboxylic acid into the halogen alkyl esters and to cause the same to interact with secondary amines. The production of the halogen alkyl esters is preferably carried out by causing alkylene halogen hydrines to react with 1-aryl-cycloalkyl-1-carboxylic acids or their halides, esters or anhydrides in the presence or absence of condensation agents or by causing alkylene halogen hydrines or alkylene dihalides to react with salts of these acids and replacing by halogen the hydroxy groups which possibly may be present in the obtained compounds.

By addition of alkyl halides, alkylene halides, aryl sulfonic acid esters, dialkyl sulfates, aralkyl halides and so on the quaternary compounds of the above esters are obtained in the usual manner. If, for the conversion of the cycloalkyl-carboxylic acid halogen hydrine esters, tertiary amines like trimethyl amine or triethylamine are used, the quaternary ammonium compounds are directly obtained.

The 1-aryl-cycloalkyl-1-carboxylic acids are mostly known; the compounds not known hitherto can be produced in the same manner as the corresponding products described in the literature.

The present invention may be illustrated, but not limited, by the following examples, the parts being by weight, unless otherwise stated.

*Example 1*

20.8 parts of 1-phenyl-cyclopentyl-1-carboxylic acid chloride, obtained from the acid (cf. Am. Soc. 1934, 56, 715) by means of thionyl chloride, are dissolved in 250 parts by volume of absolute ether, then, while stirring and cooling with a mixture of common salt and ice a solution of 12 parts of diethyl amino ethanol in 50 parts by volume of absolute ether is allowed to drop thereinto, the temperature being maintained below 0° C., whereupon stirring is continued during 2 hours at room temperature. Now, the whole is twice shaken out with water and once with diluted hydrochloric acid, the combined aqueous solutions are made alkaline with a potassium carbonate solution and shaken out with ether. The ethereal solution is washed with water, dried over potassium carbonate and the solvent is distilled off. The base boils at a pressure of 0.07 mm. at 112°–115° C.

If, instead of diethylaminoethanol, 1-dimethylamino-3-propanol is used, a compound with very similar properties is obtained.

If, instead of the 1-phenyl-cyclopentyl-1-carboxylic acid chloride, the chlorides of the corresponding carboxylic acids methylated in the phenyl nucleus are used, one obtains the following esters:

1-(2'- methylphenyl)-cyclopentyl-1-carboxylic acid-diethylaminoethanol-ester B. P.$_{0.05}$ mm. 119°–120° C. and therefrom the hydrochloride of the melting point of 173°–174° C., 1-(3'- methylphenyl)-cyclopentyl-1-carboxylic acid-diethylaminoethanol-ester B. P.$_{0.08}$ mm. 117°–119° C. and therefrom the hydrochloride melting at 148°–149° C. and 1-(4'- methylphenyl)-cyclopentyl-1-carboxylic acid-diethylaminoethanol-ester B. P.$_{0.03}$ mm. 113°–115° C. and therefrom the hydrochloride melting at 167°–168° C.

*Example 2*

20.4 parts of 1-phenyl-cyclohexyl-1-carboxylic acid (Am. Soc. 1934, 56, 715) are heated for 24 hours to boiling, while stirring, with 14 parts of β-chloroethyl-diethylamine and 20 parts of potassium carbonate in 250 parts by volume of dry acetic ester. After cooling the potassium chloride is filtered off by suction, the residue washed with acetic ester and the combined acetic ester solutions are extracted by means of diluted hydrochloric acid. The acid solution thus obtained is first shaken out with ether, then the base is made free by means of potassium carbonate solution and taken up in ether. After having dried the ethereal solution the solvent is distilled off. The residue boils at 136°–138° C. and a pressure of 0.12 mm. By introducing hydrochloric acid gas into an ethereal solution of the base the hydrochloride melting at 162° C. is obtained (when recrystallised from absolute alcohol+acetic ester).

However, if the methyl or ethyl ester respectively of the 1-phenyl-cyclohexyl-1-carboxylic acid is boiled with diethyl amino ethanol, there results, with distillation of methanol or ethanol respectively, the formation of the diethyl amino ethanol ester of the acid.

Example 3

23.7 parts of 1-(3':4'-dimethylphenyl)-cyclopentyl-1-carboxylic acid chloride are interacted according to Example 1 with 12 parts of diethyl amino ethanol. The base so-obtained boils at 0.05 mm. pressure at 126°–128° C. When working in the same manner, but using 23.7 parts of 1-(4'-methylphenyl)-cyclohexyl-1-carboxylic acid chloride and 12 parts of diethyl amino ethanol, a base having the boiling point of 138°–140° C. at 0.08 mm. pressure is obtained.

The base made according to Example 1 from 23.7 parts of 1-phenyl-2:5-dimethyl-cyclopentyl-1-carboxylic acid chloride and 12 parts of diethyl amino ethanol boils at 128°–130° C. at a pressure of 0.06 mm.

Very similar compounds are obtained when diethyl amino ethanol is replaced by 1-dimethylamino-3-propanol.

Example 4

46 parts of 1-phenyl-cyclohexyl-1-carboxylic acid chloride are caused to react with 17 parts of ethylene chlorohydrine in the presence of pyridine, then, after completion of the interaction, the reaction mixture is shaken with ether and water, the ethereal solution dried, the solvent evaporated and the residue fractionated in vacuo. The 1 - phenyl-cyclohexyl-1-carboxylic acid-$\beta$-chloroethyl ester boils at 110°–115° C. at 0.02 mm. pressure. 27 parts of this compound are caused to react in the heat with 14 parts of piperidine, then, after completion of the reaction, the mixture is shaken with ether and water and, after the evaporation of the solvent from the ethereal solution, the 1-phenyl-cyclohexyl-1-carboxylic acid piperidine ethyl ester is obtained in form of a bright oil being well soluble in acids. In high vacuo it boils under a pressure of 0.1 mm. at 155°–160° C.

Example 5

20.8 parts of 1-phenyl-cyclopentyl-1-carboxylic acid chloride are dissolved in 200 parts of absolute benzene. While stirring and cooling, a solution of 11 parts of $\gamma$-dimethylaminopropanol in 50 parts of absolute benzene is caused to drop thereinto and the whole is subsequently heated to boiling for 1 hour. The mixture is twice shaken with water and once with dilute hydrochloric acid. The collected aqueous solutions are extracted with ether, the base freed by means of potassium carbonate and taken up in ether. The ethereal solution is washed with water, dried over potassium carbonate and the solvent is distilled off.

The 1-phenyl-cyclopentyl-1-carboxylic acid-$\gamma$-dimethylaminopropanol ester boils at 0.25 mm. pressure at 125°–127° C. Therefrom may be obtained the hydrochloride melting at 147°–148° C.

In the same manner the following esters can be produced from the corresponding acid chlorides:

1 - (2'-methylphenyl)-cyclopentyl-1-carboxylic acid-$\gamma$-dimethylaminopropanol ester, B. P.$_{0.08\ mm.}$ 119°–121° C., and therefrom the hydrochloride melting at 135°–136° C., 1 - (3'-methylphenyl)-cyclopentyl-1-carboxylic acid-$\gamma$-diamethylaminopropanol ester, B. P.$_{0.09\ mm.}$ 117°–120° C. and therefrom the hydrochloride melting at 135°–136° C.

1 - (4'-methylphenyl)-cyclopentyl-1-carboxylic acid-$\gamma$-dimethylaminopropanol ester, B. P.$_{0.04\ mm.}$ 109°–110° C., and therefrom the hydrochloride melting at 186°–187° C., and 1 - (3':4'-dimethylphenyl)-cyclopentyl-1-carboxylic acid-$\gamma$-dimethylaminopropanol ester, B. P.$_{0.15\ mm.}$ 136°–137° C. and therefrom the hydrochloride of the melting point of 156°–158° C.

Example 6

19.4 parts of 1-phenyl-cyclobutyl-1-carboxylic acid chloride are caused to interact with 12 parts of diethylaminoethanol in the manner indicated in Example 5. On working up 1-phenyl-cyclobutyl-1-carboxylic acid diethylaminoethanol ester boiling at 108°–110° C. at 0.1 mm. pressure is obtained and therefrom the hydrochloride melting at 151°–152° C.

In the same manner homologues or the nuclear-substituted 1 - phenylcyclobutyl-1-carboxylic acid esters respectively may be prepared; thus may be enumerated the derivatives of the 1-(2'-methylphenyl)-cyclobutyl-1-carboxylic acid, of the 1-(3'-methylphenyl)-cyclobutyl-1-carboxylic acid, of the 1-(4'-methylphenyl)-cyclobutyl-1-carboxylic acid, etc.

Example 7

18 parts of 1-phenyl-cyclopropyl-1-carboxylic acid chloride are caused to react according to the indications of Example 5 with 12 parts of diethylaminoethanol. After working up one obtains 1-phenyl-cyclopropyl-1-carboxylic acid diethylaminoethanol ester of the boiling point at 0.05 mm. pressure of 105°–107° C. and therefrom the hydrochloride melting at 133°–134° C.

In the same manner the homologues or nuclear-substituted 1-phenylcyclopropyl-1-carboxylic acid esters may be prepared; thus there may be cited the derivatives of the 1-(2'-methylphenyl)-cyclopropyl-1-carboxylic acid, of the 1-(3'-methylphenyl)-cyclopropyl-1-carboxylic acid, of the 1-(4'-methylphenyl)-cyclopropyl-1-carboxylic acid.

Moreover, also the alkylated cyclopropane- or cyclobutane- or cyclopentane-phenylcarboxylic acids respectively may be used, such as for instance: 1-phenyl - 2 - methyl-cyclopropyl-1-carboxylic acid or 1-(2'-methyl-phenyl)-2-methyl-cyclopropyl-1-carboxylic acid or 1-(3'-methylphenyl)-2-methyl-cyclopropyl-1-carboxylic acid or 1-(4'-methyl-phenyl)-2-methyl-cyclopropyl-1-carboxylic or 1-phenyl-2-ethyl-cyclopropyl-1-carboxylic acid or the like.

Example 8

23.7 parts of 1-phenyl-cycloheptyl-1-carboxylic acid chloride are dissolved in 300 parts by volume of absolute ether, then, while stirring and well cooling with a freezing mixture, a solution of 12 parts of diethylaminoethanol in 50 parts by volume of absolute ether is caused to drop thereinto, the temperature being maintained below 0° C. Then the whole is further stirred for 2 hours at room temperature, shaken twice with water and once with dilute hydrochloric acid, the collected aqueous solutions are made alkaline by means of potassium carbonate and shaken with ether. The ethereal solution is washed with water, dried over potassium carbonate and the solvent is distilled off. The so-obtained base boils at a pressure of 0.07 mm. at 140° C.

All of the tertiary amines thus obtained can easily be quaternised by heating with diethyl sulfate, dimethyl sulfate, benzyl chloride or halogen alkyl, thus yielding the corresponding ammonium salts.

What we claim is:

1. A basic ester of the formula

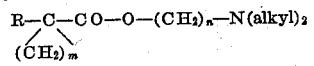

wherein R stands for a member selected from the group consisting of phenyl and methylphenyl, $m$ stands for one of the integers 3, 4 and 5, and $n$ stands for one of the integers 2 and 3.

2. The 1-phenyl-cyclopentyl-1-carboxylic acid diethylamino ethanol ester of the formula

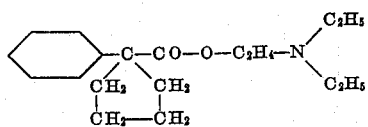

being a colorless liquid boiling at 112°–115° C. at 0.07 mm. pressure.

3. The 1-(3':4'-dimethylphenyl)-cyclopentyl-1-carboxylic acid diethylamino ethanol ester of the formula

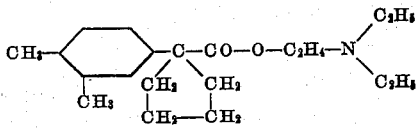

being a colorless liquid boiling at 126°–128° C. at 0.05 mm. pressure.

4. The 1-(4'-methylphenyl)-cyclohexyl-1-carboxylic acid diethylaminoethanol ester of the formula

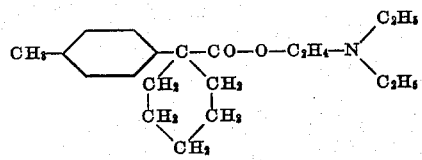

being a liquid boiling at 138°–140° C. at 0.08 mm.

HENRY MARTIN.
FRANZ HÄFLIGER.